(12) United States Patent
Hunt et al.

(10) Patent No.: US 8,020,141 B2
(45) Date of Patent: *Sep. 13, 2011

(54) OPERATING-SYSTEM PROCESS CONSTRUCTION

(75) Inventors: Galen C. Hunt, Bellevue, WA (US); James R. Larus, Mercer Island, WA (US); John D. DeTreville, Seattle, WA (US); Edward P. Wobber, Menlo Park, CA (US); Martin Abadi, Palo Alto, CA (US); Michael B. Jones, Redmond, WA (US); Trishul Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1746 days.

This patent is subject to a terminal disclaimer.

(21) Appl. No.: 11/005,562

(22) Filed: Dec. 6, 2004

(65) Prior Publication Data

US 2006/0123417 A1 Jun. 8, 2006

(51) Int. Cl.
*G06F 9/44* (2006.01)
*G06F 9/445* (2006.01)

(52) U.S. Cl. ......... 717/106; 717/108; 717/117; 717/169

(58) Field of Classification Search .................. None
See application file for complete search history.

(56) References Cited

U.S. PATENT DOCUMENTS

| | | |
|---|---|---|
| 4,885,684 A | 12/1989 | Austin et al. |
| 4,916,637 A | 4/1990 | Allen et al. |
| 5,031,089 A | 7/1991 | Liu et al. |
| 5,057,996 A | 10/1991 | Cutler et al. |
| 5,179,702 A | 1/1993 | Spix et al. |
| 5,317,568 A | 5/1994 | Bixby et al. |
| 5,329,619 A | 7/1994 | Page et al. |
| 5,339,443 A | 8/1994 | Lockwood |
| 5,349,682 A | 9/1994 | Rosenberry |
| 5,361,359 A | 11/1994 | Tajalli et al. |
| 5,367,681 A | 11/1994 | Foss et al. |
| 5,455,951 A | 10/1995 | Bolton et al. |
| 5,469,571 A | 11/1995 | Bunnell |
| 5,481,717 A | 1/1996 | Gaboury |
| 5,522,075 A | 5/1996 | Robinson et al. |
| 5,551,051 A | 8/1996 | Silverthorn et al. |
| 5,574,911 A | 11/1996 | D'Angelo et al. |
| 5,590,001 A | 12/1996 | Ino et al. |

(Continued)

FOREIGN PATENT DOCUMENTS

CN 1549108 A 11/2004

(Continued)

OTHER PUBLICATIONS

Bogojevic, et al., "The Architecture of Massive Multiplayer Online Games", retrieved on Feb. 25, 2009 at <<http://graphics.cs.lth.se/theses/projects/mmogarch/som/pdf>>, Department of Computer Science, Lund University, Sep. 8, 2003, Chapter 4, 11 pages.

(Continued)

*Primary Examiner* — Chuck O Kendall
(74) *Attorney, Agent, or Firm* — Lee & Hayes, PLLC

(57) ABSTRACT

Described herein is an implementation of a technology for the construction, identity, and/or optimization of operating-system processes. At least one implementation, described herein, constructs an operating-system process having the contents as defined by a process manifest. Once constructed, the operating-system process is unalterable.

54 Claims, 5 Drawing Sheets

U.S. PATENT DOCUMENTS

| | | | |
|---|---|---|---|
| 5,590,281 | A | 12/1996 | Stevens |
| 5,666,519 | A | 9/1997 | Hayden |
| 5,694,601 | A | 12/1997 | White |
| 5,737,605 | A | 4/1998 | Cunningham et al. |
| 5,752,032 | A | 5/1998 | Keller et al. |
| 5,768,532 | A | 6/1998 | Megerian |
| 5,794,052 | A | 8/1998 | Harding |
| 5,845,129 | A | 12/1998 | Wendorf et al. |
| 5,857,195 | A | 1/1999 | Hayashi et al. |
| 5,878,408 | A | 3/1999 | Van Huben et al. |
| 5,923,878 | A | 7/1999 | Marsland |
| 5,931,938 | A | 8/1999 | Drogichen et al. |
| 5,938,723 | A | 8/1999 | Hales, II et al. |
| 5,958,050 | A | 9/1999 | Griffin et al. |
| 5,963,743 | A | 10/1999 | Amberg et al. |
| 5,974,572 | A | 10/1999 | Weinberg et al. |
| 5,991,518 | A | 11/1999 | Jardine et al. |
| 6,003,129 | A | 12/1999 | Song et al. |
| 6,006,328 | A | 12/1999 | Drake |
| 6,009,476 | A | 12/1999 | Flory et al. |
| 6,038,399 | A | 3/2000 | Fisher et al. |
| 6,066,182 | A | 5/2000 | Wilde et al. |
| 6,072,953 | A | 6/2000 | Cohen et al. |
| 6,078,744 | A | 6/2000 | Wolczko et al. |
| 6,080,207 | A | 6/2000 | Kroening et al. |
| 6,092,189 | A | 7/2000 | Fisher et al. |
| 6,115,819 | A | 9/2000 | Anderson |
| 6,144,992 | A | 11/2000 | Turpin et al. |
| 6,157,928 | A | 12/2000 | Sprenger et al. |
| 6,161,051 | A | 12/2000 | Hafemann et al. |
| 6,182,275 | B1 | 1/2001 | Beelitz et al. |
| 6,202,147 | B1 | 3/2001 | Slaughter et al. |
| 6,247,128 | B1 | 6/2001 | Fisher et al. |
| 6,279,111 | B1 | 8/2001 | Jensenworth et al. |
| 6,292,941 | B1 | 9/2001 | Jollands |
| 6,321,334 | B1 | 11/2001 | Jerger et al. |
| 6,324,622 | B1 | 11/2001 | Okpisz et al. |
| 6,341,371 | B1 | 1/2002 | Tandri |
| 6,351,850 | B1 | 2/2002 | van Gilluwe et al. |
| 6,381,742 | B2 | 4/2002 | Forbes et al. |
| 6,405,361 | B1 | 6/2002 | Broy et al. |
| 6,434,694 | B1 | 8/2002 | Slaughter et al. |
| 6,438,549 | B1 | 8/2002 | Aldred et al. |
| 6,442,754 | B1 | 8/2002 | Curtis |
| 6,446,260 | B1 | 9/2002 | Wilde et al. |
| 6,487,723 | B1 | 11/2002 | MacInnis |
| 6,542,926 | B2 | 4/2003 | Zalewski et al. |
| 6,546,546 | B1 | 4/2003 | Van Doorn |
| 6,629,152 | B2 | 9/2003 | Kingsbury et al. |
| 6,658,447 | B2 | 12/2003 | Cota-Robles |
| 6,715,144 | B2 | 3/2004 | Daynes et al. |
| 6,732,220 | B2 | 5/2004 | Babaian et al. |
| 6,748,592 | B1 | 6/2004 | Porter |
| 6,816,905 | B1 | 11/2004 | Sheets et al. |
| 6,842,782 | B1 | 1/2005 | Malik et al. |
| 6,868,539 | B1 | 3/2005 | Travison et al. |
| 6,944,754 | B2 | 9/2005 | Zilles et al. |
| 6,973,517 | B1 | 12/2005 | Golden et al. |
| 6,977,994 | B2 | 12/2005 | Stephenson et al. |
| 6,988,261 | B2 * | 1/2006 | Sokolov et al. ............... 717/118 |
| 7,000,092 | B2 | 2/2006 | Gehman et al. |
| 7,062,764 | B2 | 6/2006 | Cohen et al. |
| 7,086,056 | B2 | 8/2006 | Fukushima |
| 7,089,289 | B1 | 8/2006 | Blackmore et al. |
| 7,155,713 | B1 | 12/2006 | Burkhardt et al. |
| 7,167,867 | B1 | 1/2007 | Rago |
| 7,222,106 | B2 | 5/2007 | Block et al. |
| 7,222,341 | B2 | 5/2007 | Forbes et al. |
| 7,278,030 | B1 | 10/2007 | Chen et al. |
| 7,454,477 | B2 | 11/2008 | Talluri et al. |
| 7,484,245 | B1 | 1/2009 | Friedman et al. |
| 7,600,232 | B2 | 10/2009 | Hunt et al. |
| 2001/0029605 | A1 | 10/2001 | Forbes et al. |
| 2002/0004852 | A1 | 1/2002 | Sadovsky et al. |
| 2002/0099954 | A1 | 7/2002 | Kedma et al. |
| 2002/0100017 | A1 | 7/2002 | Grier et al. |
| 2003/0031404 | A1 | 2/2003 | Pedersen |
| 2003/0056084 | A1 | 3/2003 | Holgate et al. |
| 2003/0061404 | A1 | 3/2003 | Atwal et al. |
| 2003/0084256 | A1 | 5/2003 | McKee |
| 2003/0097581 | A1 | 5/2003 | Zimmer |
| 2003/0130854 | A1 | 7/2003 | Galanes et al. |
| 2003/0191867 | A1 | 10/2003 | Czajkowski |
| 2003/0200402 | A1 | 10/2003 | Willman et al. |
| 2003/0212990 | A1 | 11/2003 | Brodkorb et al. |
| 2003/0221012 | A1 | 11/2003 | Herrmann et al. |
| 2003/0233644 | A1 | 12/2003 | Cohen et al. |
| 2004/0025016 | A1 | 2/2004 | Focke et al. |
| 2004/0034850 | A1 | 2/2004 | Burkhardt et al. |
| 2004/0061067 | A1 | 4/2004 | Clauss |
| 2004/0064736 | A1 | 4/2004 | Obrecht et al. |
| 2004/0078799 | A1 | 4/2004 | Koning et al. |
| 2004/0123273 | A1 | 6/2004 | Hammerich et al. |
| 2004/0153991 | A1 | 8/2004 | Chen et al. |
| 2004/0187096 | A1 | 9/2004 | Dumont |
| 2004/0193819 | A1 | 9/2004 | Marinescu et al. |
| 2004/0199763 | A1 | 10/2004 | Freund |
| 2004/0226023 | A1 | 11/2004 | Tucker |
| 2004/0236861 | A1 | 11/2004 | Bondar et al. |
| 2004/0268171 | A1 | 12/2004 | Inoue et al. |
| 2005/0005261 | A1 | 1/2005 | Severin |
| 2005/0021537 | A1 | 1/2005 | Brendle et al. |
| 2005/0050069 | A1 | 3/2005 | Vaschillo et al. |
| 2005/0060687 | A1 | 3/2005 | Ghazaleh et al. |
| 2005/0071592 | A1 | 3/2005 | DeCaro |
| 2005/0071828 | A1 | 3/2005 | Brokenshire et al. |
| 2005/0081181 | A1 | 4/2005 | Brokenshire et al. |
| 2005/0091658 | A1 * | 4/2005 | Kavalam et al. ............... 718/104 |
| 2005/0119902 | A1 | 6/2005 | Christiansen |
| 2005/0125789 | A1 | 6/2005 | Dijkstra et al. |
| 2005/0203988 | A1 | 9/2005 | Nollet et al. |
| 2005/0223239 | A1 | 10/2005 | Dotan |
| 2005/0246718 | A1 | 11/2005 | Erlingsson et al. |
| 2006/0005082 | A1 | 1/2006 | Fossum et al. |
| 2006/0031815 | A1 | 2/2006 | Bhagia et al. |
| 2006/0069692 | A1 | 3/2006 | Pernia |
| 2006/0085789 | A1 | 4/2006 | Laborczfalvi et al. |
| 2006/0123401 | A1 | 6/2006 | O'Brien et al. |
| 2007/0061483 | A1 | 3/2007 | Dauger |
| 2007/0256080 | A1 | 11/2007 | Smith et al. |
| 2008/0250414 | A1 | 10/2008 | Brokenshire et al. |

FOREIGN PATENT DOCUMENTS

| | | |
|---|---|---|
| EP | 1033648 A2 | 6/2000 |
| EP | 1443398 A | 8/2004 |
| KR | 10-1992-0013166 A | 7/1992 |
| KR | 20010007119 | 1/2001 |
| RU | 2337398(C2) | 10/2008 |
| WO | WO02093370 A | 11/2002 |
| WO | WO03038599 A2 | 5/2003 |
| WO | WO2004025491(A1) | 3/2004 |
| WO | WO2004099949(A1) | 11/2004 |

OTHER PUBLICATIONS

Back et al., "Processes in KaffeOS: Isolation, Resource Management, and Sharing in Java", Proceedings of the 4th USENIX Symposium, Dec. 6, 2004, pp. 333-pp. 346.

Chaki et al, "Types as Models: Model Checking Message-Passing Programs", Proceedings of the 29th ACM Symposium on Principles of Programming Lanuages, 2002, pp. 45-pp. 57.

Hunt et al., "Singularity Technical Report 1: Singularity Design Motivation", Microsoft Research, 2004 Microsoft Corporation, pp. 1-pp. 4.

McNamee et al., "An Attribute Grammar Approach to Compiler Optimization of Intra-Module Interprocess Communication", International Journal of Parallel Programming, vol. 20, Nov. 3, 1991, pp. 181-pp. 202.

Tanenbaum, "Modem Operating Systems", Prentice Hall Inc., 2001, pp. 168-pp. 175.

Tost, "Loosely typed versus strongly typed Web Services", Sep. 2, 2005, IDM, pp. 1-pp. 14.

Hunt et al: "Broad New OS Research: Challenges and Opportunities" Retrieved from the Internet: URL: http://research.microsoft.com/os/singularity/publications/hotos2005_broadnewresearch.pdf> [retrieved on Dec. 2, 2008].

Mikunov A., "Rewrite MSil Code on the Fly with the .NET Framework Profiling API", MSDN Magazine (Online) Sep. 2003, Retrieved from the Internet: URL: <<http://msdn.microsoft.com/en-us/magazine/cc188743(printer).aspx>> retrieved onDec. 12, 2008).
Tatsubori et al: "Open Java: A Class-Based Macro System for Java"2000 [Retrieved from the Internet: URL: http://www.springerlink.com/content/n64gdultayqfmcjc/fulltext.pdf> [retrieved on Dec. 2, 2008].
"Trademark Electronic Search System (TESS) from the USPTO database" for "WINDOWS" trademark of Microsoft filed in USPTO Aug. 20, 1999; http://tess2.uspto.gov/bin/gate.exe? f=doc &state=n00gan.5.26.
Microsoft Press Computer Dicitonary, Second Edition, 1994, Published by Penguin Books, Ltd., pp. 23-24 and p. 279.
Microsoft Press Computer Dictionary Third Edition: 1997 3 pages.
"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.
Acceta et al.; "A New Kernel Foundation for UNIX Development", In Summer USENIX Conference, Atlanta, GA, Jun. 1986, pp. 93-112.
Chiueh, et al., "Integrating segmentation and paging protection for safe, efficient and transparent software extensions", SOSP-17, ACM, Dec. 1999, pp. 140-153.
Dorward et al; "The Inferno Operating System"; Bell Labs Technical Journal, 2 (1), Winter 1997, pp. 5-18.
Engler et al.; "Exokernel: an Operating System Architecture for Application-Level Resource Management"; In Proceedings of the Fifteenth ACM Symposium on Operating System Principles, Cooper Mountain Resort, Co, 1995, pp. 251-266.
Goldberg et al.; "Smalltalk-80: The Language and Its Implementation"; Addison-Wesley, May 1983.
Hartig et al.; "The Performance of u-kernel-based Systems"; In Proceedings of the Sixteenth ACM Symposium on Operating Systems Principles (SOSP '97), Saing Malo, France, 1997, pp. 66-77.
Hawblitzel et al.; "Implementing Multiple PRotection Domains in Java"; In Proceedings of the 1998 USENIX Annual Technical Conference, New Orleans, LA, Dec. 1998, pp. 259-270.
Hawblitzel et al.; "Luna: A Flexible Java Protection System"; In Proceedings of the Fifth ACM Symposium on Operating System Design and Implementation (OSDI'02), Boston, MA, 2002, pp. 391-402.
"JSR-000121 Application Isolation API Specification"; available at http://jcp.org/aboutJava/communityprocess/pfd/jsr121/index.html; printed Sep. 7, 2006, 1 page.
"JSR 121: Application Isolation API Specification" Java Specification Requests, printed Sep. 7, 2006, 7 pages.
Rajamani et al.; "Conformance Checking for Models of Asynchronous Message Passign Software"; In Proceedings of the International Conference on Computer Aided Verification (CAV 02), Springer, Copenhagen, Denmark, Jul. 2002, pp. 166-179.
Redell et al.; "Pilot: An Operating System for a Personal Computer"; Communications of the ACM, 23 (2), 1980, pp. 81-92.
Rosenblum et al.; "The Impact of Architectural Trends on Operating System Performance"; In Proceedings of the Fifteenth ACM Symposium on Operating System Principles, Copper Mountain Resort, CO, 1995, pp. 285-298.
Skousen, et al., "Resource Access and Protection in the Sombrero Protection Model, Software Protection Data Structures and Hardware Range Protection Lookaside Buffer", ASU 64-bit OS Group White Paper 2, Technical Report, TR-95-013, Jan. 1996, 35 pages.
Swift et al; "Improving the Reliability of Commodity Operating Systems"; In Proceedings of the 19th ACM Symposium on Operating Systems Principles (SOSP '03), Bolton Landing, NY, 2003, pp. 207-222.
Swinehart et al.; "A Structural View of the Cedar Programming Environment"; ACM Transactions on Programming Languages and Systems, 8(4), 1986, pp. 419-490.
Wahbe et al.; "Efficient Software-Based FAult Isolation"; In Proceedings of the Fourteenth ACM Symposium on Operating System Principles, Asheville, NC, 1993, pp. 203-216.
Weinreb et al.; "Lisp Machine Manuel"; Symbolics, Inc., Cambridge, MA, Jul. 1981.

Wood et al.; "An In-Cache Address Translation Mechanism"; In Proceedings of the Thirteenth Annual International Symposium on Computer Architecture, Jun. 1986, pp. 158-166.
"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.
"Trademark Electronic Search System (TESS) from the USPTO database" for "WINDOWS" trademark of Microsoft filed in USPTO Aug. 20, 1999; http://tess2.uspto.gov/bin/gate.exe? f=doc &state=n00gan.5.26.
Microsoft Press Computer Dictionary, Second Edition, 1994, Published by Penguin Books, Ltd., pp. 23-24 and p. 279.
Microsoft Press Computer Dicitonary Third Edition: 1997 3 pages.
Pike, et al., "Plan 9 from Bell Labs".
Pike, et al, "The Use of Name Spaces in Plan 9", Operating Systems Review, vol. 27, #2, Apr. 1993, pp. 72-76.
Watson, et al., "Design and implementation of the Trusted BSD MAC framework", Proceedings of 2003 DARPA Information Survivability Conference and Exposition, Sec. 1&5-7, Apr. 2003, pp. 38-49.
Acharya, et al., "MAPbox: Using Parameterized Behavior Classes to Confine Applications", University of California, Santa Barbara, May 1, 1999, pp. 1-19.
Fraim, "Scomp: A Solution to the Multilevel Security Problem", IEEE, 1983, pp. 26-34.
Kurchuk, et al., "Recursive Sandboxes: Extending Systrace to Empower Applications", retrieved on Sep. 4, 2009 at <<http://web.archive.org/web/20040725140723/http://nsl.cs.columbia.edu/projects/gridlock/systrace_extensions.pdf>>, 2004, pp. 1-16.
"Microsoft Computer Dicitonary", retrieved on Sep. 4, 2009 at <<http://proquest.safaribooksonline.com/print?xmlid=0735614954/ch20>>, Fifth Edition, pp. 1-2.
Perrine, et al.; "An Overview of the Kernelized Secure Operating System (KSOS)", Proceedings of the 7th DoD/NBS Computer Security Conference, 1984, pp. 0-14.
Perrine, "The Kernelized Secure Operating System (KSOS)", ;login: The Magazine of USENIX & SAGE, vol. 27, No. 6, 2002, pp. 36-40.
Provos, "Improving Host Security with System Call Policies", Proceedings of the 12th USENIX Security Symposium, USENIX Association, Aug. 2003, pp. 257-271.
"Variable Scope", retrieved on Sep. 4, 2009 at <<http://irc.essex.ac.uk/www.iota-six.co.uk/d/d5_variable_scope.asp>>, Scope, 2003, pp. 1-5.
Golm et al., "Beyond Address Spaces—Flexibility, Preformance, Protection, and Resource Management in the Tpe-Safe JX Operating System", Proc. of the 8th Workshop on Hot Topics in Operating Systems, May 2001, pp. 1-pp. 6.
Berman, et al., "Application-Level Scheduling on Distributed Heterogeneous Networks (Technical Paper)", Supercomputing 1996 Proceedings of the 1996 ACM/IEEE Conference on Supercomputing (CDROM), IEEE Computer Society, Washington, DC, 1996, pp. 1-29.
Gay et al., "Session Types for Inter-Process Communication", University of Glasgow, Department of Computing Science Technical Report (TR-2003-133), Mar. 2003, 33 pages.
Huang et al., "Securing Web Application Code by Static Analysis and Runtime Protection", Proceedings of the 13th International Conference on World Wide Web, ACM, New York, NY, 2004, 12 pages.
Khokhar, et al., "Heterogeneous Computing: Challenges and Opportunities", available at least as early as Mar. 6, 2007, at <<http://meseec.ce.rit.edu/eecc722-fall2002/papers/hc/1/r6018.pdf>>, IEEE, 1993, pp. 18-27.
Lyonnard, et al., "Automatic Generation of Application-Specific Architectures for Heterogeneous Multiprocessor System-on-Chip", available at least as early as Mar. 6, 2007, at <<http://delivery.acm.org/10.1145/380000/379015/ p518-Iyonnard.pdf? key1=379015 &key2=7123613711&coll=GUIDE&dl=GUIDE &CFID=16158147&CFTOKEN=58686892>>, ACM, 2001, pp. 518-523.
Sun, et al., "Synthesis of Application-Specific Heterogeneous Multiprocessor Architectures using Extensible Processors", available at least as early as Mar. 6, 2007, at <<http://ieeexplore.ieee.org/iel5/9501/30140/01383333.pdf?isNumber=>>, IEEE, 2005, pp. 1-6.

* cited by examiner

OPERATING-SYSTEM PROCESS CONSTRUCTION

TECHNICAL FIELD

This invention generally relates to a technology for the construction, identity, and/or optimization of operating-system processes.

BACKGROUND

In the realm of computer science and, more particularly, the art of operating systems, the term "operating-system process" (or more simply, "process") is well-known.

Applications are often composed of one or more processes. A process may have one or more threads. A process is typically loaded from storage from one or more load modules. The operating system (OS) is aware of and, indeed, may manage and supervise one or more separate processes running on a computer.

Operating-System Process

Conventionally, OSs support the use of an operating-system process for execution of programs. An operating-system process defines the execution state or context of one or more streams of computer-executable instructions. These streams are sometimes called "threads."

According to the Microsoft Developers Network (MSDN®) library (at msdn.microsoft.com/library/default.asp?url=/library/en-us/dllproc/base/about_processes_and_threads.asp), the concepts of processes and a threads are described in this way:

Each process provides the resources needed to execute a program. A process has a virtual address space, executable code, open handles to system objects, a security context, a unique process identifier, environment variables, a base priority, minimum and maximum working set sizes, and at least one thread of execution. Each process is started with a single thread, often called the primary thread, but can create additional threads from any of its threads.

A thread is the entity within a process that can be scheduled for execution. All threads of a process share its virtual address space and system resources. In addition, each thread maintains exception handlers, a scheduling priority, thread local storage, a unique thread identifier, and a set of structures the system will use to save the thread context until it is scheduled. The thread context includes the thread's set of machine registers, the kernel stack, a thread environment block, and a user stack in the address space of the thread's process. Threads can also have their own security context, which can be used for impersonating clients.

According to webopedia.com, a process is "an executing program." Alternatively, webopedia.com defines a process as "an operating system concept that refers to the combination of a program being executed and bookkeeping information used by the operating system. Whenever you execute a program, the operating system creates a new process for it. The process is like an envelope for the program: it identifies the program with a process number and attaches other bookkeeping information to it."

In conventional OSs, processes are created either statically or dynamically. The components of a statically created process are assembled at "link-time" into a monolithic load module, which is then loaded. The components of a dynamically created process are assembled dynamically, at "load-time" or at "run-time," from multiple constituent load modules, commonly referred to as Dynamic Link Libraries (DLLs).

With monolithic process architectures (where process components are statically assembled at "link-time" into a monolithic load module), all executable code for the process is pre-packaged into a single load module. With only the single load module, updating components of a process when a constituent change occurs requires the entire process load module to be reconstituted.

Because of that, one can ensure the integrity and security of the executable code within the statically and monolithically created process. In other words, the architecture inherently enables one to identify the code of the process (e.g., via hashing the single load module) so that unauthorized or inappropriate alterations to that code can be reliably detected. In this way, malicious code (from, for example, a "virus," "worm," or "spyware") cannot invade the executable code of a process with stable contents and having a stable security statement.

Since all of the code of the process is assembled statically and monolithically, a static analysis on a monolithic load module may accurately determine many useful characteristics of its future execution, such as whether its future execution is stable. Furthermore, an optimization analysis on a monolithic load module may accurately optimize the code for its future execution.

Dynamically assembled process architectures provide more flexibility than monolithic process architectures in updating components of a process. These architectures can potentially save storage and memory space, as when a single copy of a component can be shared among several processes.

With conventional dynamically assembled process architectures, it is difficult to perform and easy to invalidate stability and optimization analyses. That is because the code for each of the multiple individual components is packaged independent of other components, and each component's execution environment is not known before load time.

Moreover, the components (e.g., DLLs) of a conventional dynamically assembled process can load into a running process, alter the state of that process, and then unload from that process. This may leave the process state altered arbitrarily. Because of this, it is particularly difficult to perform integrity and security analyses on conventional dynamically assembled processes before the code of the process is executed or even while its code is executing.

Recent managed application systems (such as Sun® Java® Runtime or Microsoft® Common Language Runtime (CLR)) go further in allowing arbitrary code generation at runtime, as well as arbitrary code loading. However, even with these advances, there remains a need for construction of operating-system processes, particularly dynamically assembled processes, which can be analyzed for integrity and security.

SUMMARY

Described herein is an implementation of a technology for the construction, identity, and/or optimization of operating-system processes. At least one implementation, described herein, constructs an operating-system process having the contents as defined by a process manifest. Once constructed, the operating-system process is unalterable.

BRIEF DESCRIPTION OF THE DRAWINGS

The same numbers are used throughout the drawings to reference like elements and features.

DETAILED DESCRIPTION

The following description sets forth techniques implementing a technology for the construction, identity, and/or optimization of "operating-system processes" (or more simply, "processes"). An exemplary implementation of these techniques may be referred to as an "exemplary process construction."

It is difficult and sometimes nearly impossible to perform effective analyses on the integrity, security, and stability of, and perform optimization on, conventional dynamically assembled processes. Primarily, this is because the fully assembled identity of the code in the process is not known until load-time or run-time and often changes during execution of the process. Since linking different dynamic components (e.g., DLLs) can change in general a process's semantics arbitrarily, there is in general little certainty possible about what the conventional dynamically assembled process will do. This is an impediment in practice to building systems that are secure, stable, robust, and deterministic. Existing workarounds are limited in their scope and usability.

The techniques described herein provide a refreshing and invigorating approach to the realm of computer science (and operating systems in particular) for the construction of operating-system processes, including processes that are dynamically assembled. With this new approach, system architects, developers, and administrators can more readily and reliably construct software and operating-system processes that can be secure, stable, robust, and deterministic.

Exemplary Process Construction

Figure 1:
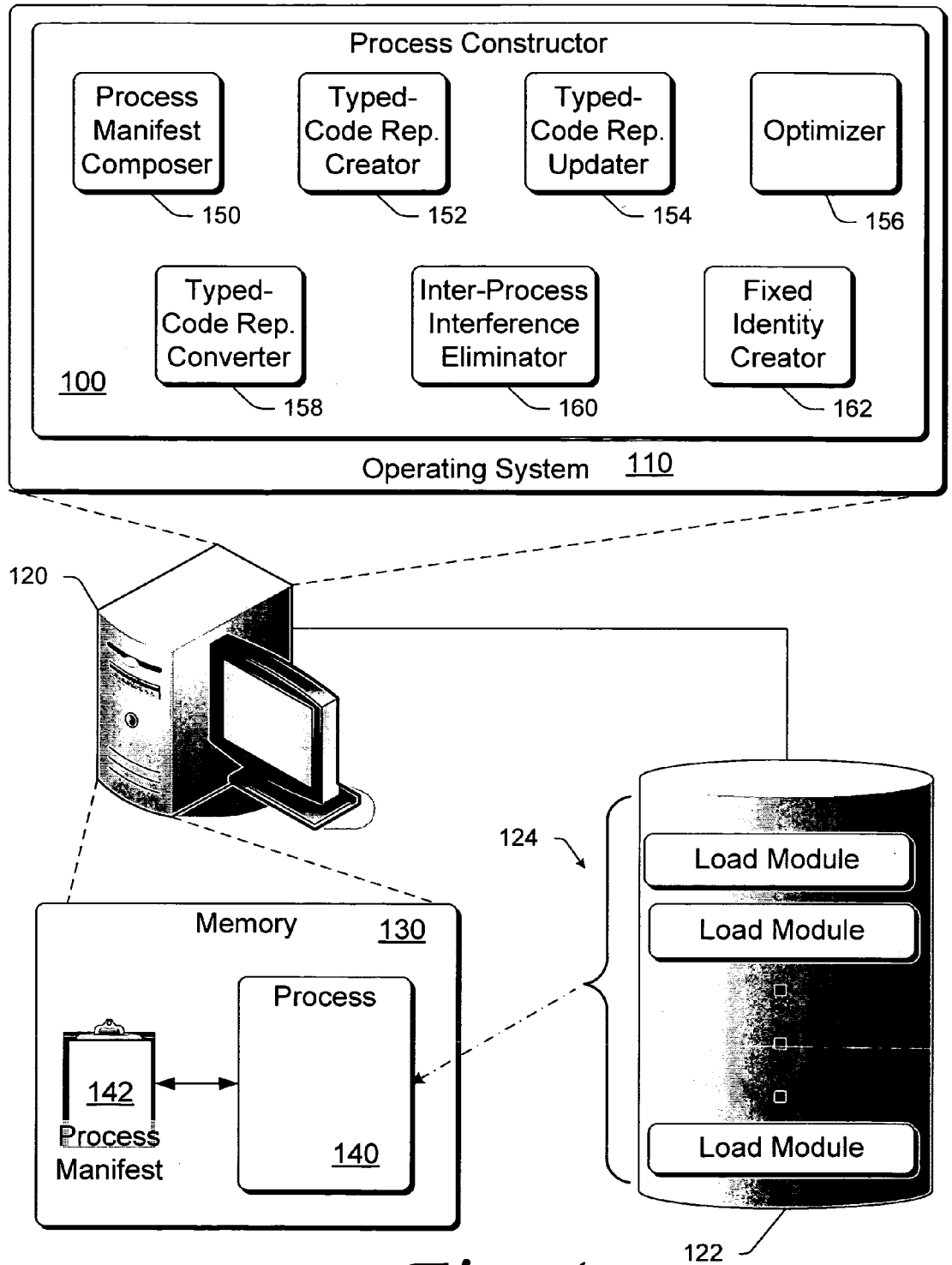
FIG. 1 shows an example operating scenario for an implementation described herein.

FIG. 1 shows an operational scenario for the exemplary process construction. It shows a process construction architecture 100 as part of an operating system 110 stored and/or executing on a computer 120. The process construction architecture 100 may be, as shown in FIG. 1, part of the operating system. Alternatively, all or part of the process construction architecture 100 may be separate from the operating system, but still working in cooperation with the operating system.

The process construction architecture 100 constructs processes in a computer's working memory from a dynamic set of constituent components edited by a set of extending components. Once constructed, the executable code of an active process is fixed. Once fixed, an active process cannot run new processor-executable code. In order to do that, the process must be freshly re-constructed with the new code as part of it, or a new add-on process must be created.

The dynamic set of constituent and extending components is typically manifested as a set of load modules stored in computer storage. The process construction architecture 100 constructs processes in a manner that allows for analyses regarding one or more various properties (e.g., integrity, security, reliability, availability, resource-usage analysis, completeness analysis, and/or stability) to be performed, as well as for various desirable optimizations to be performed.

Computer 120 includes a computer storage device 122 (e.g., hard drive, RAID system, etc.) that stores a set of load modules 124 and a working memory 130. In the example in FIG. 1, the process construction architecture 100 constructs a process 140 which is stored in working memory 130. As depicted here, the process 140 is constructed from the load modules 124, which are manifestations of the process's constituent components edited by the process's extending components.

The process 140 has a process manifest 142, which defines the ultimate contents of the process 140. Part of those ultimate contents includes the process's constituent edited by the process's extending components. As depicted here, the process manifest 142 is directly associated with a process (such as process 140) whose composition it describes.

In constructing a process, the process construction architecture 100 may employ one or more of the following functional components: a process manifest composer 150, a typed-code representation creator 152, a typed-code representation updater 154, an optimizer 156, a typed-code representation converter 158, an inter-process interference eliminator 160, and a fixed identity creator 162. While FIG. 1 shows these functional components as separate from each other, the functionality of one or more of these functional components may be combined.

Process Manifest

Figure 2:
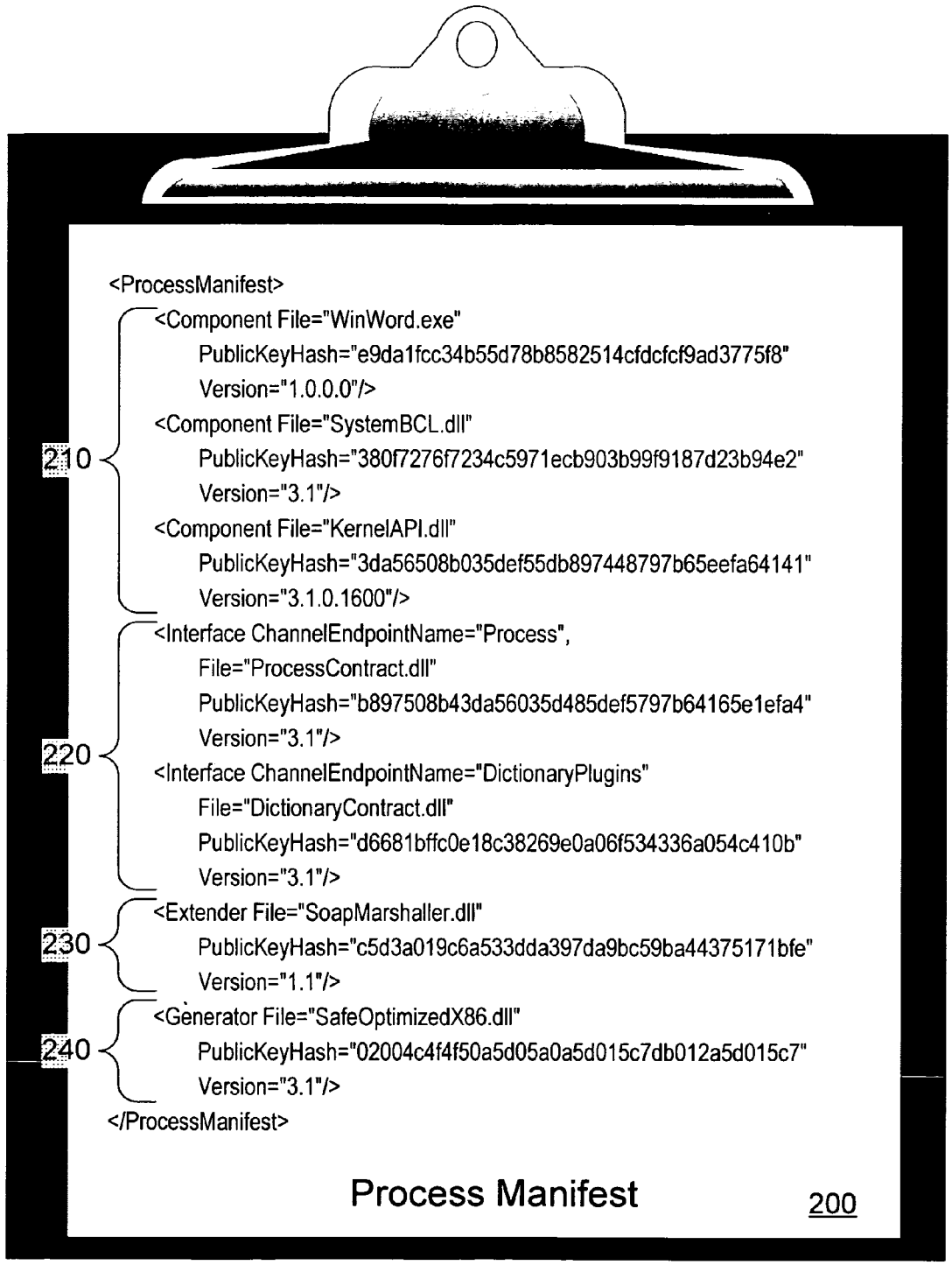
FIG. 2 shows an example of a process manifest data structure which may be utilized and/or composed by an implementation described herein.

FIG. 2 shows an example data structure of a process manifest 200. The data structure typically includes formatted metadata. The process manifest provides a complete list of the contents ultimately needed to construct the yet-to-be-constructed process.

As depicted in FIG. 2, the exemplary data structure of the process manifest 200 includes one or more of the following types of content definitions:

Constituent components, which define the load modules of the process. These constituent components contain the code that will run in the process. In one embodiment, the load modules are expressed in a format which describes the code in instructions and the types of data operated on by those instructions, thus the code is referred to as typed-code. FIG. 2 shows examples of definitions of constituent components at 210.

Extending components, which add or modify code or objects based on the code and types in the constituent components. With the exemplary process construction, extension of the process's code is thereby allowed, but only in controlled, predictable ways. For example, the extending components complete their execution before the rest of the process begins its execution. The extending components are also called "extenders." Extending components often are manifested by load modules which execute during process construction. FIG. 2 shows examples of definitions of extending components at 220.

External interfaces, which define the set of external (or "extra-process") communications types exported or imported by the constituent components of the process. These external interfaces define and constrain a process's communications with other parts of the system or with other processes. FIG. 2 shows an example of an external interface definition at 230.

Code Generators, which create the native instruction stream ultimately fed to system processors. Constituent code need not be written in the native instruction stream, so a code generator component may be needed to translate. FIG. 2 shows an example of a code generator interface definition at 240.

The content definitions typically define entities (such as load modules or code generators) that are external to the actual manifest itself.

Process Manifest Composer

The process manifest composer 150 creates or facilitates the creation of a process manifest, such as the process manifest 142 in FIG. 1 and the process manifest 200 in FIG. 2.

The functions of process manifest composer 150 may be performed at the request of another process or by request of a system administrator installing or updating software. A process that starts one or more child processes is sometimes called a "parent process."

In some instances, the process manifest composer 150 may compose a child process's manifest directly from information provided by its parent or by another requesting process. In other instances, the composer 150 can use a pre-computed or pre-installed process manifest, or extend such a pre-existing process manifest. For example, the process manifest composer 150 may retrieve the results of its previous computations or compositions, rather than repeating the calculations or compositions, when repeating its access to or composition of identical or similar process manifests. Alternatively, the composer 150 may utilize a partial manifest and complete the manifest with assistance from other processes or the operating system.

In an OS employing the process construction architecture 100, the OS may have multiple applications (e.g., software programs composed of one or more processes) and multiple "application manifests." The composer 150 may use information from one or more application manifests to pre-compute and cache all or portions of one or more process manifests, typed-code representations, program analyses, and instruction streams.

Typed-Code Representation Creator

The typed-code representation creator 152 creates a typed-code representation of the process from the load modules of the named constituent components and external interfaces (which are both defined in the process manifest).

Herein, the term "typed-code representation" is defined as an Intermediate Language (IL) representation that describes all of the code and types of data objects manipulated by the code expressed in a load module and describes which data objects are manipulated by each element of code. No additional code or types are added to such a process once it begins to run, which allows a wider range of analyses before it begins to run. Moreover, because the IL is itself a constrained format that enables analyses, a very wide range of such analyses on the typed-code representations are possible.

In at least one implementation, described herein, the typed-code representation format of the load modules is Microsoft® Intermediate Language (MSIL). Those of ordinary skill in the art will recognize that MSIL is just one example and that other implementations might use other typed-code representation formats including, but not limited to, Java® Byte Code or typed assembly language. The constituent components may also contain code in a typed-code representation, of course, or in another format that can be used to generate the typed-code representation in the load module.

Additional types and code may be automatically introduced as needed to satisfy external interfaces that are stated and referenced in a process manifest. Cross-component references to constituent components and external interfaces are resolved in the typed-code representation.

The typed-code representation creator 152 verifies the typed code (which is the code described in the typed-code representation) to ensure that the typed code conforms to required system compositional properties or policies before adding the typed code to the process's typed-code representation. For example, system policy might require that software components that are not known to work together, according to certain chosen criteria, may not be linked together.

An example of a system compositional property or policy is the policy that each component of a process must be type safe and that the composition of components within the process is also type safe. A component or process is said to be type safe (to maintain type safety) if associated with each data element is a type to which it belongs and no data element is ever treated as a type to which it does not belong.

Alternatively, the typed-code representation creator 152 additionally verifies that the entire typed code and the entire process manifest are also consistent with required system compositional properties or policies. For example, system policy might require that the whole system pass an analysis meant to ensure real-time responsiveness.

For example, the typed-code representation creator 152 can verify that the typed code does not violate type safety or that it implements inter-process communication correctly. All analyses of programs in a typed-code representation can be invalidated if type safety can be violated, and all analyses of communicating programs can become invalidated if communications requirements can be violated The typed-code representation creator 152 can further confirm that it satisfies certain global compositional properties or policies, such as policies based on the publisher or publishers of the code, or on policies established by the publisher or publishers of the code, or on policies established by the administrator, or on policies otherwise established. The typed-code representation creator 152 can further confirm that the typed code does not violate certain desired global properties related to security, integrity, type safety, conformance to communication requirements, conformance to partial specifications of code behavior, etc.

Typed-Code Representation Updater

The typed-code representation updater 154 updates (or "modifies") the typed-code representation via the extending components. These extending components are defined or listed or outlined in the process manifest. Furthermore, particular systems may have a set of standard extending components available or required. The typed-code representation updater 154 allows each extending component to manipulate the typed-code representation. Extending components take as their input the typed-code representation and additional arguments or parameters specified in the process manifest.

The output of one extending component may be the input of another, and extending components may require repeated invocations to complete their work. In the exemplary process construction, the extending components are invoked repeatedly until the typed-code representation converges. Each extending component is given repeated chances to update the typed-code representation until no further updates are required.

Convergence signals the end of work, since no further transformations are possible. The typed-code representation updater 154 verifies that the resultant typed-code representation conforms to required system compositional properties, etc. The extending components can be invoked opportunistically as transformational opportunities occur.

Alternatively, the list of extending components is ordered, with each extending component invoked in order, as necessary.

The typed-code representation updater 154 may invoke an extending component, such as a communication marshalling extender, to enumerate each type of data structures communicated across process boundaries and generate a function to copy that type of data structure into a stream of bytes suitable for communication across a process boundary. Another example of an extending component is a process-integrity extender which inserts additional checks, such as checks on the contents and size of data structures to verify the integrity of process execution.

In the exemplary process construction, verification by the typed-code representation updater 154 is potentially optimized or avoided by using information verified or generated at earlier stages, such as when typed code is first introduced into the typed-code representation. Alternatively, the results of an earlier application of an extending component can be cached and reused later to avoid subsequent reapplications.

The Optimizer

The optimizer 156 optimizes the typed-code representation via process-global analysis and optimization on the typed-code representations. The optimizer 156 may also performs cross-process analysis and optimization.

As illustrated in FIG. 1, the optimizer 156 may be part of the process construction architecture 100. Alternatively, the optimizer may be external to the process construction architecture 100. The optimizer may also be composed of one or more separate components.

Those skilled in the art will recognize that analysis and optimizations which can now be performed safely on a process-global basis include, but are not limited to, the following: constant propagation, code folding, dead code elimination, function inlining and partial function inlining, partial evaluation, and function specialization.

In conventional approaches, such "whole-program" optimizations were possible only for an entire binary (such as a .EXE or .DLL) but the scope of such optimizations was limited because the possibility of dynamic linking and runtime code generation did not make available the complete set of code for a process. Furthermore, conventional approaches lacked an appropriately structured a manifest or typed-code representation describing the entire contents of a process.

The optimizer 156 enables full process-global optimization by fixing the set of types at process-creation time or earlier, and converting all code and all type information (including the type information for the process's external interfaces) into a unified typed-code representation.

In addition to process-global optimization, the optimizer 156 may perform cross-process optimization. Because the typed-code representations of two or more communicating processes are stable once they are both created, it may be safe to make optimizations across the multiple processes provide the set of communicating processes can be determined.

For example, the cost of cross-process communication can often be reduced if complimentary modifications are made to process, such as removing marshaling code for the marshaling and unmarshalling data objects when it is known that both processes will use and can interchange the same internal representations of data objects. Since both processes use the same internal representation, there is no need for marshaling code that would convert from the internal representation of a data object to an external representation. Typically, other more detailed cross-process analyses and optimizations also become possible to perform after the complete typed-code representations for the communicating processes are known. Also, larger optimization are possible as more specificity is available about the execution environment of the code.

In addition, the optimizer 156 may analyze, transform, optimize, and check the processor-executable instruction stream (e.g., executable code) of a process.

After the typed-code representations have been updated, the optimizer 156 may safely perform process-global analysis on the typed-code representation because the typed-code representation for the process is complete. This analysis can be used to detect possible and actual errors in the program.

Those skilled in the art will recognize that analysis which can now be performed safely on a process-global basis include, but are not limited to, the following: dataflow analysis, abstract interpretation, model checking, software model.checking, conformance checking, and global value flow analysis. The errors that can be detected include, but are not limited to, the following: buffer overflow, null pointer dereference, unchecked error conditions, unhandled exceptions, and interface protocol violations.

In addition, the optimizer 156 may optimize the typed-code representation based upon a history of prior executions of a process. A process may be analyzed as it executes to determine how best a process may be optimized given its actual operation. That analysis may be recorded so that the typed-code representation of that process may be more precisely optimized based on that recorded analysis.

The Typed-Code Representation Converter

The typed-code representation converter 158 generates a processor-executable instruction stream from the typed-code representation (using the code generator defined in the process manifest). The resulting stream employs the native instruction set of one or more processors of the computer on which the process is intended to be executed.

The typed-code representation converter 158 generates executable code by applying the listed or specified code generator(s) for the local processors to the information in the typed-code representation. The typed-code representation converter 158 creates the entire processor-executable instruction stream before the process begins executing. Furthermore, the typed-code representation converter 158 creates the entire processor-executable instruction stream of a process when the code for the process is installed on a system and is recreated when a constituent component of the process is reinstalled or otherwise modified on the system.

Alternatively, portions of the processor-executable instruction stream are generated from the typed-code representation in time for execution using Just-In-Time (JIT) compilation techniques known to those skilled in the art. Alternatively still, the processor-executable instruction stream (or a portion thereof) is regenerated as performance measurements are made, using techniques known to those skilled in the art. In other alternatives, the processor-executable instruction stream (or a portion thereof) is regenerated as changes occur in the configuration of the process, or in the configuration of the processes with which it communicates, or in the configuration of the operating system as a whole.

The Inter-Process Interference Eliminator

The inter-process interference eliminator 160 analyzes, verifies, and/or eliminates inter-process memory or state interference in a process. It performs an element of "process memory management" (that element being the elimination of inter-process memory or state interference) that is conventionally performed by operating systems by segregating processes into their own "workspace."

It is common for operating systems to include a "process memory management" component. The major purpose of process memory management is ensuring that active processes do not corrupt the state, as stored in memory, of other active processes. The process memory management limits or prevents uncontrolled inter-process interference in the form of uncontrolled memory access amongst active processes.

Without the assurance provided by process memory management, the data and the executing code of a process may be indiscriminately and unilaterally altered, removed, changed, and modified by another process and be done so without notice or knowledge of such action. With the assurance provided by process memory management, a designer, implementer, administrator, or user of a process is confident that its data and executing code remains intact. To further the purposes of process memory management, there is typically some form of restricted messaging or selective shared-memory system for purposes of inter-process communication without indiscriminate interference.

The conventional approach to ensuring that active processes "play well with others" is the reservation of an isolated "workspace" in memory for each active process. When a process is created, a conventional process manager reserves a defined range of a central-processing unit's (CPU's) addressable memory (called "address space") for each active process. A conventional process is free to operate within its defined "address space," but cannot directly operate outside its address space.

This conventional approach is so widely used that many CPUs (and other computer hardware) are designed to perform many of the process management at a hardware level. Indeed, the association between the conventional terminology of "process" and its "address space" is so strong that these terms are often considered synonymous to those of ordinary skill in the art.

With the process construction architecture 100, the terms "process" and "address space" are no longer synonymous. Indeed, the concepts of these terms are now independent from each other.

Unlike conventional approaches, the process construction architecture 100 does not require separately defined address spaces for each process. The process construction architecture 100 does not require that each process be placed in its own isolated address space; that each process be placed in separate protection rings; and/or that hardware-based protection mechanisms be employed to ensure isolation of process address spaces.

Instead of utilizing the conventional approach of process management that isolates each process into its own "address space," the exemplary process construction manages a process's executable code so that the executable code (in its final form) will not perform inter-process interference when such code is executed. As shown in FIG. 1, the inter-process interference eliminator 160 does this process management.

During this process management, the inter-process interference eliminator 160 detects any actions (which the executable code would perform when executed) that may include the possibility of inter-process interference. Once detected, the inter-process interference eliminator 160 modifies the resulting executable code so that there is no possibility of inter-process interference when that code is executed. In one embodiment, the executable code maintains the property of type safety.

Processes created in accordance with the process construction architecture 100 may be aggregated into a single address space and/or single protection ring based on a run-time or administrative policy.

Although it is not necessary, processes created in accordance with the process construction architecture 100 may be placed in their own address space with hardware-based memory protection. Although it is not necessary, processes created in accordance with the process construction architecture 100 and run on behalf of a specific user may be segregated into a single address space to minimize the number of hardware-based protection boundaries crossed when running the user's processes.

Fixed Identity Creator

The fixed identity creator 162 devises a "fixed identity" for the process derived from one or more of the following: the process manifest, the typed-code representation to be contained within the process, and the code generators used to produce a processor-executable instruction stream.

This fixed identity is ultimately a function of the typed-code representation contained within the process, the extenders used to modify the code, the optimizers used to optimize the code, and the identity of the code generators used to produce a native instruction stream from the typed-code representation, the explicit and implicit options passed to each of these components, etc., including the fixed identities of each of these components, and any changes to these inputs will produce a different and distinct identity for the output.

In a sense, this fixed identity is a specification of this process within the space of all possible processes; the space of all possible processes being defined as the space of the computations possible with the process. In the most general case, the process identity function performs a computation on the entire typed-code representation contained within the process after performing the previous sub-actions. However, for practical purposes, simpler functions are often appropriate.

The fixed identity creator 162 may, for example, perform a hash function on the digital signatures of the constituent components and extending components of the process and so on. This approach is practical, particularly when the internal connections are limited to the cross-component binding dependencies expressed in the components and fixed by the component digital signatures. Instead of naming the process contents directly, this approach names them indirectly by naming the inputs and specifying the formula by which they are to be combined.

Alternatively, the fixed identity creator 162 may, for example, perform a hash function on the process manifest of a process. The process manifest contains sufficient data to identify the constituent code components and extensions that will make up the process. A hash of the component code is an example of such data.

With the exemplary process construction, the actual constituent components are checked against the required values while the process is loading. If there is a match, a process name is derived from the process manifest. Through this mechanism, the process might be given an identity suggested by the software publisher in the manifest (e.g., "ProgramX11.6539.6666"). This information suggested by the publisher may provide for a partial identity. That partial identity incorporates useful information (e.g., the marketed name of a program, its version, its publication date, etc.) for further inspection while leaving out other less useful information (e.g., name of constituent load modules, name of authors, etc.)

This information might also be combined with information about the process instance, such as the identity of the publisher (e.g., CompanyA) or evidence that the load modules for a process came from the published (e.g., a digest of the load modules signed using CompanyA's private key). Similarly, the information might be combined with an indicator for the rights of or given by the publisher (e.g., the right to access certain protected resources).

In the exemplary process construction, classes of inputs and classes of formulas may also be named in or matched against a process identity. This allows for assignment of a fixed name, identity, or pattern for a given class of processes that, for example, share the same constituent components but may differ in the set of optimizations or analyses that are performed on the typed-code representation based on these constituent components.

Those skilled in the art will recognize that a process's "fixed identity" may be used for a wide range purposes including, but not limited to, the following: granting access to restricted resources, collecting runtime usage information, selecting product support options, and applying system compatibility patches. Those skilled in the art will further recognize that a process's "fixed identity" may further include the identity of a parent process, the operating system, and other processes which may have influenced the process manifest or that might affect its execution, or that might exchange information with it.

In an alternative implementation, the fixed identity creator 162 creates two separate identities. One is for the process's contents and another is for the running process created by the OS when it is requested to do so. The identity for the process contents can then be related to multiple processes, concurrently or over time.

While creation of the process identity is logically listed, herein, after global optimization and generation of the native instruction stream, those skilled in the art will recognize that creation of the process identity can be reordered, especially when such reordering does not change the ultimate process identity or allow impersonation.

In one implementation, a process identity is created before global optimization, and may thereby be independent of the details of the global optimization. In another implementation, a process identity is created after global optimization, but before generation of the native instruction stream, and may thereby be independent of the details of the generation of the native instruction stream. In yet another implementation, multiple identities can be created using various subsets and combinations of the available information, and the relation among them can be represented by additional metadata.

In accordance with the techniques described herein, the executable code running in a process is fixed (or "sealed") when the process is constructed. By sealing the process at creation time, the operating system can provide the process a high degree of confidence that it can hide sensitive information, such as passwords or other confidential information, from hostile parties.

The process construction architecture 100 prevents the loading of code into a process that might either accidentally or intentionally circumvent security protections. It provides mechanisms for the operating system to inspect and verify all code in a process. It also prevents access to a process's state without the process's explicit knowledge and control. In accordance with the techniques described herein, access to a process's state can be disallowed even through external mechanisms like debugging mechanisms.

Methodological Implementation of Exemplary Process Construction

Figure 3:
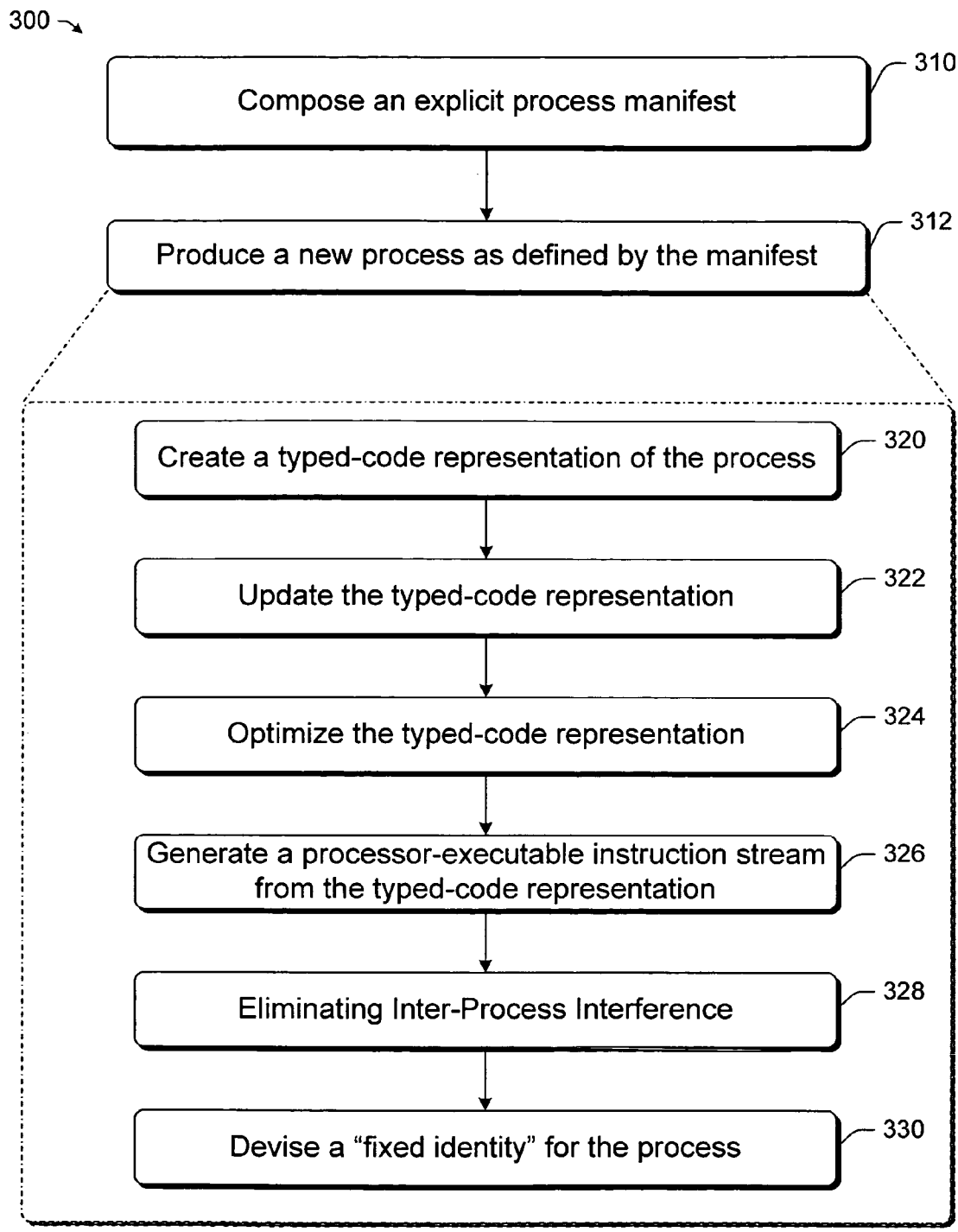
FIG. 3 shows a flow diagram showing a methodological implementation described herein.

FIG. 3 shows a method 300 performed by the functional components of the process construction architecture 100 when constructing an operating-system process. This methodological implementation may be performed in software, hardware, or a combination thereof. For ease of understanding, the method is delineated as separate steps represented as independent blocks in FIG. 3; however, these separately delineated steps should not be construed as necessarily order dependent in their performance. Additionally, for discussion purposes, the method 300 is described with reference to the process construction architecture 100 of FIG. 1.

At 310 of FIG. 3, the process manifest composer 150 composes an explicit "process manifest" (e.g., process manifest 142) that defines the ultimate contents of a to-be-constructed process. The process manifest may be composed without construction and without execution of its associated process.

At 312, one or more of other the functional components of the process construction architecture 100 produces (or "constructs") a new process based upon its explicit process manifest. When the process construction architecture 100 is part of the OS, the functional components of the architecture typically respond to a request for process-production by constructing the process.

The production action of block 312 is composed of several distinct sub-actions illustrated in FIG. 2 at blocks 320 through 330. Those sub-actions are briefly described here (but are described more fully later):

At 320, the typed-code representation creator 152 creates a typed-code representation of the process from the named constituent components and external interfaces (which are both, of course, defined in the process manifest).

At 322, the typed-code representation updater 154 updates the typed-code representation via the extending components (which are defined in the process manifest).

At 324, the optimizer 156 optimizes the typed-code representation.

At 326, the typed-code representation converter 158 generates a processor-executable instruction stream from the typed-code representation (using the code generator defined in the process manifest). The resulting stream employs the native instruction set of one or more processors of the computer on which the process is intended to be executed.

Figure 4:
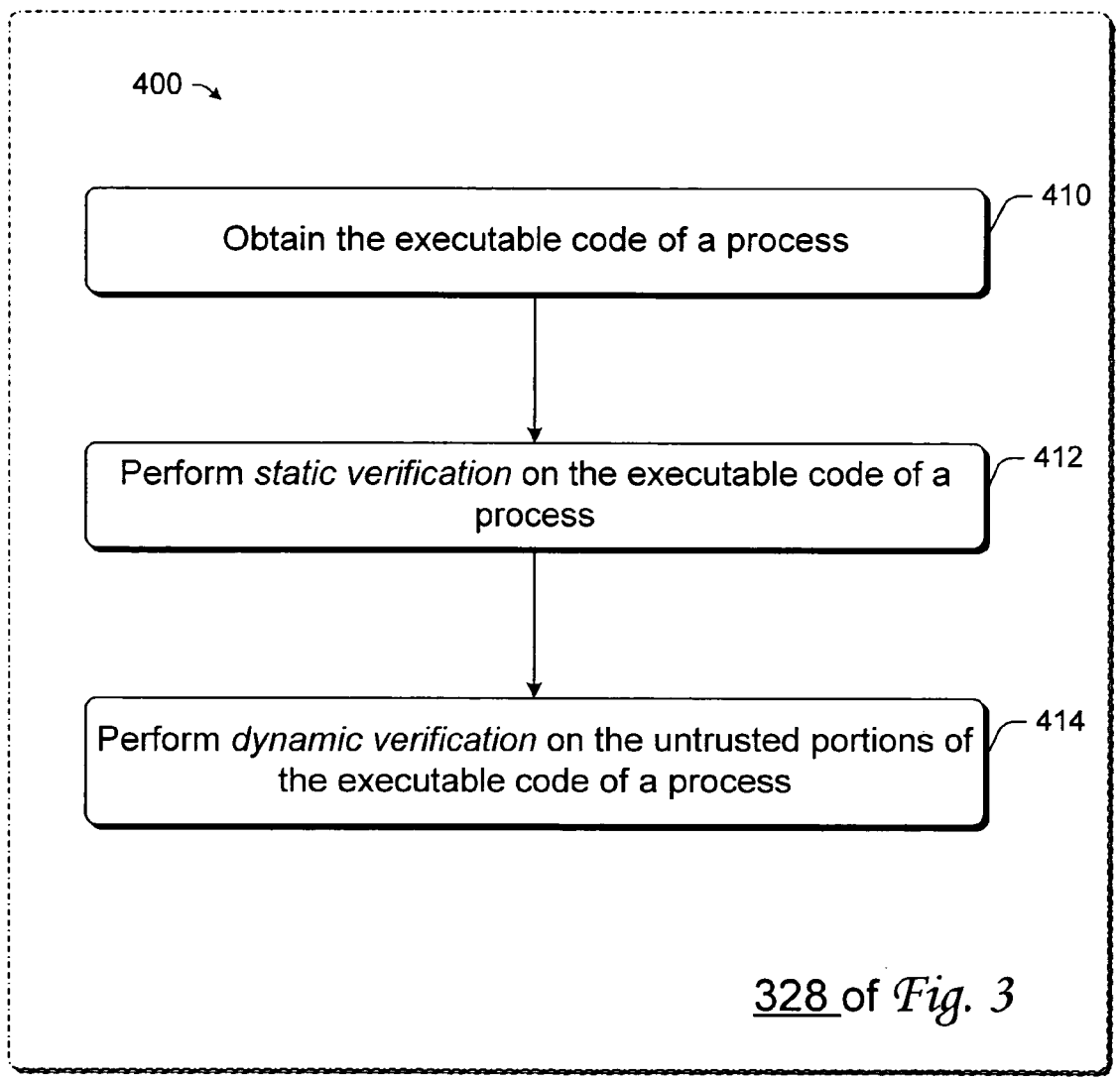
FIG. 4 shows a flow diagram showing a methodological implementation described herein.

At 328, the inter-process interference eliminator 160 verifies that processor-executable instruction stream of this process does not interfere with the state of other processes. The method performed by the inter-process interference eliminator 160 is shown in FIG. 4 and discussed below.

At 330, the fixed identity creator 162 devises a "fixed identity" for the process.

Because the output of each of these process-production sub-actions is deterministic and repeatable, the exemplary process construction may store or cache results from the sub-actions, including, but not limited to: all portions of the process manifest, the typed-code representation, analysis intermediate or final results, or the processor-executable instruction stream. Moreover, the process-generation sub-actions may be performed well before a request is made for execution of a process as, for example, when a program is installed on a system.

After the construction of the process (illustrated by block 312 and by blocks 320 through 330), an operating system may execute the newly constructed process. Once it is executing, the process is active.

Methodological Implementation of Inter-Process Interference Elimination

FIG. 4 shows a method 400 performed by the inter-process interference eliminator 160 to analyze, verify, and/or eliminate inter-process interference in a subject process. The method 400 is a breakdown of sub-action 328 of FIG. 300.

This methodological implementation may be performed in software, hardware, or a combination thereof. For ease of understanding, the method is delineated as separate steps represented as independent blocks in FIG. 4; however, these separately delineated steps should not be construed as necessarily order dependent in their performance.

At 410 of FIG. 4, the inter-process interference eliminator 160 obtains the executable code of a process. The eliminator may receive the code as part of the process construction (for example, as is illustrated in FIG. 3). The eliminator may process the code either in a typed-code representation or in its final form as an native instruction stream executable by system processors.

At 412, the eliminator 160 verifies using static analysis that the executable code of the process, when executed, will not engage in inter-process interference. This is called "static verification."

At 414, the eliminator analyzes the portions of the processor-executable code which remain unverified. These portions may be called "untrusted" portions. It modifies the untrusted portions, as necessary, so that the code is unable to interfere with other processes when executed. It may insert and/or change existing code. This is called "dynamic verification."

Exemplary Computing System and Environment

Figure 5:
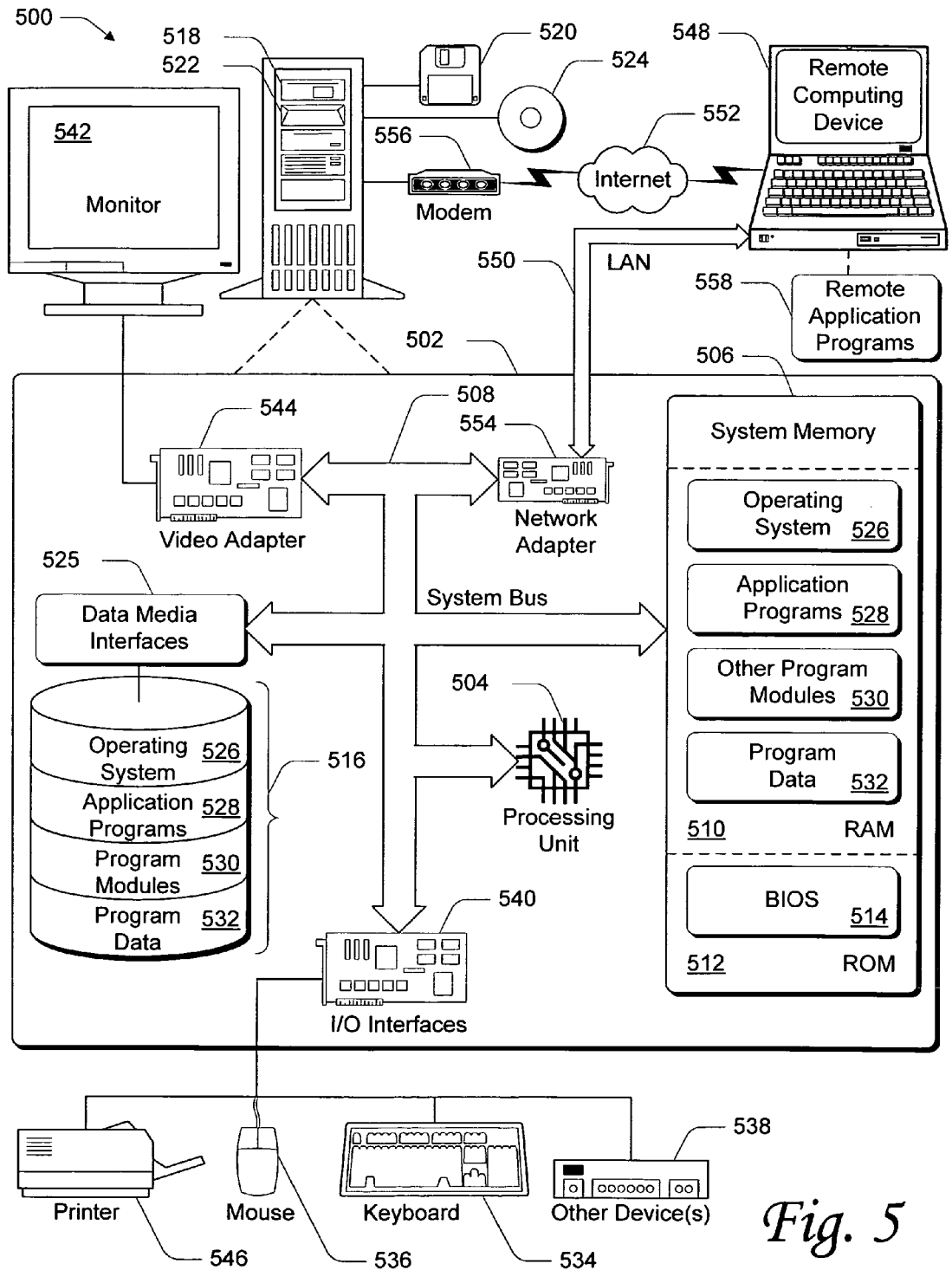
FIG. 5 is an example of a computing operating environment capable of (wholly or partially) implementing at least one embodiment described herein.

FIG. 5 illustrates an example of a suitable computing environment 500 within which an exemplary process construction, as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary process construction may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary process construction may be described in the general context of processor-executable instructions, such as program modules, being executed by a computer. Generally, program modules include routines, programs, executable code, objects, components, data structures, etc. that perform particular tasks or implement particular abstract data types. The exemplary process construction may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 may include, but are not limited to, one or more processors or processing units 504, a system memory 506, and a system bus 508 that couples various system components, including the processor 504, to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 502 typically includes a variety of processor-readable media. Such media may be any available media that is accessible by computer 502 and includes both volatile and non-volatile media, removable and non-removable media.

The system memory 506 includes processor-readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 may be connected to the system bus 508 by one or more interfaces (not shown).

The disk drives and their associated processor-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516 magnetic disk 520, optical disk 524, ROM 512, and/or RAM 510, including, by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device may also be connected to the system bus 508 via an interface, such as a video adapter 544. In addition to the monitor 542, other output peripheral devices may include components, such as speakers (not shown) and a printer 546, which may be connected to computer 502 via the input/output interfaces 540.

Computer 502 may operate in a networked environment using logical connections to one or more remote computers, such as a remote computing device 548. By way of example, the remote computing device 548 may be a personal computer, a portable computer, a server, a router, a network computer, a peer device or other common network node, and the like. The remote computing device 548 is illustrated as a portable computer that may include many or all of the elements and features described herein, relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. Such networking environments may be wired or wireless.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted, relative to the computer 502 or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computing device 502, and are executed by the data processor(s) of the computer.

Processor-Executable Instructions

An implementation of an exemplary process construction may be described in the general context of processor-executable instructions, such as program modules, executed by one or more computers or other devices. Generally, program modules include routines, programs, executable code, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary process construction may be implemented. Specifically, the exemplary process construction(s) described herein may be implemented (wholly or in part) by any program modules 528-530 and/or operating system 526 in FIG. 5 or a portion thereof.

The operating environment is only an example of a suitable operating environment and is not intended to suggest any limitation as to the scope or use of functionality of the exemplary process construction(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary process construction may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques, described herein, may be implemented, for example, on a computer system depicted in FIG. 5. More particularly, these techniques may be implemented, for example by an operating system on a computer system depicted in FIG. 5.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer storage media having processor-executable instructions that, when executed by at least one processor, perform acts comprising:
   creating one or more typed-code representations from one or more constituent components;
   generating a processor-executable instruction stream from the one or more created typed-code representations; and
   constructing an operating-system process comprising the generated processor-executable instruction stream, the generated processor-executable instruction stream being unalterable once the operating-system process is constructed.

2. One or more computer storage media as recited in claim 1, wherein the one or more constituent components comprises one or more load modules.

3. One or more computer storage media as recited in claim 1, wherein the creating act employs multiple load modules for creating one or more typed-code representations.

4. One or more computer storage media as recited in claim 1 further comprising executing the generated processor-executable instruction stream of the constructed operating-system process, the generated processor-executable instruction stream being unalterable while executing.

5. One or more computer storage media as recited in claim 1 further comprising, before the generating act, updating the one or more created typed-code representations based upon the execution of one or more extending components, wherein the one or more extending components comprise load modules which are not part the one or more constituent components.

6. One or more computer storage media as recited in claim 1 further comprising, before the generating act, updating the one or more created typed-code representations based upon the execution of one or more load modules of one or more extending components.

7. One or more computer storage media as recited in claim 1 further comprising, before the generating act, updating the one or more created typed-code representations based upon the execution of one or more extending components, wherein the updating adds additional processor-executable instructions to the generated stream that perform run-time security checks to the one or more typed-code representations.

8. One or more computer storage media as recited in claim 1 further comprising, before the generating act, updating the one or more created typed-code representations based upon the execution of one or more extending components, wherein the updating adds additional processor-executable instructions to the generated stream that perform run-time bookkeeping on the one or more typed-code representations.

9. One or more computer storage media as recited in claim 1 further comprising, before the generating act, updating the one or more created typed-code representations.

10. One or more computer storage media as recited in claim 1 further comprising, before the generating act, updating the one or more created typed-code representations, wherein the updating adds additional processor-executable instructions to the generated stream that perform run-time security checks to the one or more typed-code representations.

11. One or more computer storage media as recited in claim 1 further comprising, before the generating act, updating the one or more created typed-code representations, wherein the updating adds additional processor-executable instructions to the generated stream that perform run-time bookkeeping on the one or more typed-code representations.

12. One or more computer storage media as recited in claim 1 further comprising, before the generating act, updating the one or more created typed-code representations to add additional processor-executable instructions to the generated stream that perform a self-examining function, where the resulting operating-system process is configured to examine properties of itself.

13. One or more computer storage media as recited in claim 1 further comprising, before the generating act, updating the one or more created typed-code representations by adding new types to the one or more created typed-code representations.

14. One or more computer storage media as recited in claim 1 further comprising, before the generating act, updating the one or more created typed-code representations by adding new functions for existing types to the one or more created typed-code representations.

15. One or more computer storage media as recited in claim 1 further comprising, before the generating act, performing global optimization on the one or more created typed-code representations.

16. One or more computer storage media as recited in claim 1 further comprising, before the generating act, performing optimization on the one or more created typed-code representations.

17. One or more computer storage media as recited in claim 1 further comprising, before the generating act, performing optimization on the one or more created typed-code representations, wherein such optimization is based upon a record of previous executions of the operating-system process.

18. One or more computer storage media as recited in claim 1, wherein the generating act further comprises conditionally inserting privileged processor-executable instructions into the processor-executable instruction stream.

19. One or more computer storage media as recited in claim 1 further comprising receiving a request to construct a process, wherein the creating, generating, and constructing acts are performed in response to receiving of the request.

20. One or more computer storage media as recited in claim 1 further comprising, before the constructing act, analyzing results of one or more of the acts to determine if the results adhere to a specified set of desired properties and policies.

21. One or more computer storage media as recited in claim 1 further comprising, before the constructing act, caching results of one or more of the acts for later use.

22. One or more computer storage media as recited in claim 1 further comprising composing and persisting a process manifest defining contents that are ultimately necessary for construction of the process.

23. One or more computer storage media as recited in claim 1 further comprising:
    composing and persisting a process manifest defining contents that are ultimately necessary for construction of the process;
    receiving a request to construct a process, wherein the creating, generating, and constructing acts are performed in response to receiving of the request;
    wherein the composing and persisting acts are performed before the receiving act.

24. One or more computer storage media as recited in claim 1, wherein all components necessary for construction of the operating-system process are named in a process manifest.

25. One or more computer storage media as recited in claim 1 further comprising:
    performing the creating, generating, and constructing acts at least twice to construct a first and a second operating-system process;
    loading the first operating-system process into a defined address space in a memory addressable by a processor;
    loading the second operating-system process into the same defined address space in the memory addressable by the processor.

26. One or more computer storage media having processor-executable instructions that, when executed by at least one processor, perform acts comprising:
    creating one or more code representations from one or more constituent components;
    generating a processor-executable instruction stream from the one or more created code representations; and constructing an operating-system process comprising the generated processor-executable instruction stream, the generated processor-executable instruction stream being unalterable once the operating-system process is constructed.

27. One or more computer storage media having processor-executable instructions that, when executed by at least one processor, perform acts comprising:
    obtaining a process manifest that defines contents used in construction of an operating-system process;
    creating one or more typed-code representations from one or more load modules, wherein the creating act is based, at least in part, upon the process manifest;
    generating a processor-executable instruction stream from the one or more created typed-code representations, wherein the generating act is based, at least in part, upon the process manifest; and
    constructing an operating-system process comprising the generated processor-executable instruction stream, wherein the generated processor-executable instruction stream of the operating-system process is unalterable.

28. One or more computer storage media as recited in claim 27, wherein the creating act employs multiple load modules for creating one or more typed-code representations.

29. One or more computer storage media as recited in claim 27 further comprising executing the generated processor-executable instruction stream of the constructed operating-system process, the generated processor-executable instruction stream being unalterable while executing.

30. One or more computer storage media as recited in claim 27, wherein the process manifest defines one or more of the following types of operating-system process contents:
    constituent components, which define a base set of one or more load modules of the operating-system process;
    external interfaces, which define extra-process communication interfaces allowed for the operating-system process;
    extending components, which define another set of one or more load modules containing additional processor-executable instructions which upon execution update the generated processor-executable instruction stream and/or containing modifications to the processor-executable instructions of the generated processor-executable instruction stream;
    code generators, which produce a native instruction stream to be provided to one or more processors intended to execute the generated processor-executable instruction stream.

31. One or more computer storage media as recited in claim 27, wherein the operating-system process manifest defines process content types comprising:
    constituent components, which define a base set of one or more load modules of the operating-system process;
    external interfaces, which define extra-process communication interfaces allowed for the operating-system process;
    extending components, which define another set of one or more load modules containing additional processor-executable instructions which upon execution update the generated processor-executable instruction stream and/or containing modifications to the processor-executable instructions of the generated processor-executable instruction stream;
    code generators, which produce a native instruction stream to be provided to one or more processors intended to execute the generated processor-executable instruction stream.

32. One or more computer storage media as recited in claim 27 further comprising composing a process manifest.

33. One or more computer storage media as recited in claim 27 further comprising, before the generating act, updating the one or more created typed-code representations.

34. One or more computer storage media as recited in claim 27 further comprising, before the generating act, updating the one or more created typed-code representations to add additional processor-executable instructions to the generated stream that perform run-time security checks to the one or more typed-code representations.

35. One or more computer storage media as recited in claim 27 further comprising, before the generating act, updating the one or more created typed-code representations to add additional processor-executable instructions to the generated stream that perform a self-examining function, where the resulting operating-system process is configured to examine properties of itself.

36. One or more computer storage media as recited in claim 27 further comprising, before the generating act, updating the one or more created typed-code representations by adding new types to the one or more created typed-code representations.

37. One or more computer storage media as recited in claim 27 further comprising, before the generating act, updating the one or more created typed-code representations by adding new functions for existing types to the one or more created typed-code representations.

38. One or more computer storage media as recited in claim 27 further comprising, before the generating act, performing global optimization on the one or more created typed-code representations.

39. One or more computer storage media as recited in claim 27 further comprising, before the generating act, performing optimization on the one or more created typed-code representations.

40. One or more computer storage media as recited in claim 27, wherein the generating act further comprises conditionally inserting privileged processor-executable instruction into the processor-executable instruction stream.

41. One or more computer storage media as recited in claim 27 further comprising receiving a request to construct a process, wherein the obtaining, creating, generating, and constructing acts are performed in response to receiving of the request.

42. One or more computer storage media as recited in claim 27 further comprising, before the constructing act, analyzing results of one or more of the acts to determine if the results adhere to a specified set of desired properties and policies.

43. One or more computer storage media as recited in claim 27 further comprising, before the constructing act, caching results of one or more of the acts for later use.

44. One or more computer storage media having processor-executable instructions that, when executed by at least one processor, perform acts comprising:
    obtaining an explicit process manifest that defines contents used in construction of an operating-system process, wherein the process manifest defines one or more of the following types of operating-system process contents:
    constituent components, which define a base set of one or more load modules of the operating-system process;
    external interfaces, which define extra-process communication interfaces allowed for the operating-system process;

extendinq components, which define a set of one or more load modules that will be applied to the contents of the operating-system process; or code generators, which produce a native instruction stream to be provided to one or more processors intended to execute a processor-executable instruction stream of the operating-system process; and constructing an operating-system process having the contents as defined by the process manifest, the operating-system process being unalterable once constructed.

45. One or more computer storage media as recited in claim 44 further comprising executing the constructed operating-system process, the constructed operating-system process being unalterable while executing.

46. One or more computer storage media as recited in claim 44 further comprising, before the constructing act:
creating one or more typed-code representations from one or more load modules specified by the process manifest;
generating a processor-executable instruction stream from the one or more created typed-code representations, wherein the generating act is based, at least in part, upon the process manifest;
wherein the constructed operating-system process comprises the generated processor-executable instruction stream.

47. One or more computer storage media as recited in claim 44 further comprising, before the constructing act:
creating one or more typed-code representations from one or more load modules specified by the process manifest;
applying one or more extending components to the one or more created typed-code representations, wherein the applying act is based, at least in part, upon the process manifest;
generating a processor-executable instruction stream from the one or more created typed-code representations, wherein the generating act is based, at least in part, upon the process manifest;
wherein the constructed operating-system process comprises the generated processor-executable instruction stream.

48. One or more computer storage media as recited in claim 44 further comprising, before a generating act, updating the one or more created typed-code representations.

49. One or more computer storage media as recited in claim 44 further comprising, before a generating act, performing global optimization on the one or more created typed-code representations.

50. One or more computer storage media as recited in claim 44 further comprising, before a generating act, performing optimization on the one or more created typed-code representations.

51. One or more computer storage media as recited in claim 44 further comprising:
deriving an identity of the constructed operating-system process, wherein the identity is derived from inherent properties of the constructed operating-system process itself;
assigning the derived identity to the constructed operating-system process.

52. One or more computer storage media as recited in claim 44 further comprising:
receiving identity-influencing inputs;
deriving an identity of the constructed operating-system process, wherein the identity is based upon the derived from inherent properties of the constructed operating-system process itself and the received identity-influencing inputs;
assigning the derived identity to the constructed operating-system process.

53. One or more computer storage media as recited in claim 44 further comprising:
receiving identity-influencing inputs;
deriving an identity of the constructed operating-system process, wherein the identity is based upon the derived from inherent properties of the constructed operating-system process itself and the received identity-influencing inputs;
wherein the derived identity includes a partial identity that incorporates useful information for further inspection while leaving out other less useful information.

54. One or more computer storage media as recited in claim 44 further comprising receiving a request to construct a process, wherein the obtaining and constructing acts are performed in response to receiving of the request.

* * * * *

UNITED STATES PATENT AND TRADEMARK OFFICE
CERTIFICATE OF CORRECTION

| | |
|---|---|
| PATENT NO. | : 8,020,141 B2 |
| APPLICATION NO. | : 11/005562 |
| DATED | : September 13, 2011 |
| INVENTOR(S) | : Galen C. Hunt et al. |

It is certified that error appears in the above-identified patent and that said Letters Patent is hereby corrected as shown below:

In column 21, line 1, in Claim 44, delete "extendinq" and insert -- extending --, therefor.

Signed and Sealed this
First Day of November, 2011

David J. Kappos
*Director of the United States Patent and Trademark Office*